United States Patent
Wu et al.

(10) Patent No.: US 8,858,786 B2
(45) Date of Patent: Oct. 14, 2014

(54) EXTRACTION OF OIL SAND BITUMEN WITH TWO SOLVENTS

(75) Inventors: Xin Alex Wu, Edmonton (CA); George Burton Jones, Calgary (CA); George Cymerman, Edmonton (CA)

(73) Assignee: Syncrude Canada Ltd, Fort McMurray (CA), in trust for the owners of the Syncrude Project as such owners exist now and in the future (*) Notice: Subject to any disclaimer, the term of this patent is extended or adjusted under 35 U.S.C. 154(b) by 423 days.

(21) Appl. No.: 13/222,936

(22) Filed: Aug. 31, 2011

(65) Prior Publication Data

US 2012/0048782 A1    Mar. 1, 2012

(30) Foreign Application Priority Data

Sep. 1, 2010  (CA) .................................... 2714236

(51) Int. Cl.
   *C10G 1/04*    (2006.01)

(52) U.S. Cl.
   CPC ............ *C10G 1/045* (2013.01); *C10G 2300/44* (2013.01)
   USPC ...................................................... 208/390

(58) Field of Classification Search
   CPC .......... C10G 1/04; C10G 1/047; C10G 1/045; C10G 1/00; C10G 3/007
   USPC ................................................. 208/390–391
   See application file for complete search history.

(56) References Cited

U.S. PATENT DOCUMENTS

| | | | | |
|---|---|---|---|---|
| 2,431,677 A | * | 12/1947 | Brown | 208/425 |
| 3,117,922 A | * | 1/1964 | Leary et al. | 208/390 |
| 3,131,141 A | | 4/1964 | West | |
| 3,993,555 A | | 11/1976 | Park et al. | |
| 4,094,781 A | | 6/1978 | Snell et al. | |
| 4,189,376 A | | 2/1980 | Mitchell | |
| 4,347,118 A | | 8/1982 | Funk et al. | |
| 4,389,300 A | | 6/1983 | Mitchell | |
| 4,416,764 A | | 11/1983 | Gikis et al. | |
| 4,448,667 A | | 5/1984 | Karnofsky | |
| 4,532,024 A | | 7/1985 | Haschke et al. | |
| 4,676,889 A | * | 6/1987 | Hsieh et al. | 208/390 |
| 4,719,008 A | * | 1/1988 | Sparks et al. | 208/390 |

(Continued)

FOREIGN PATENT DOCUMENTS

| | | |
|---|---|---|
| CA | 1048432 | 2/1979 |
| CA | 1190877 | 7/1985 |

(Continued)

OTHER PUBLICATIONS

Christie John Geankoplis, Transport Porcesses and Separation Processes Principles, 4th edition, pp. 812-813.*

*Primary Examiner* — Randy Boyer
*Assistant Examiner* — Juan Valencia
(74) *Attorney, Agent, or Firm* — Bennett Jones LLP

(57) ABSTRACT

A process for extracting bitumen from oil sand using a combination of heavy solvent and light solvent is provided comprising digesting mined oil sand with a high-flash point heavy solvent (HS) to produce a dense oil sand slurry; mixing the dense slurry with a light solvent (LS) to give a heavy solvent to light solvent (HS/LS) mass ratio of about 70/30 to about 50/50 and subjecting the thinned oil sand slurry to a first stage solid-liquid separation to produce a first liquids stream containing bitumen and a first solids stream.

26 Claims, 5 Drawing Sheets

(56) References Cited

U.S. PATENT DOCUMENTS

| | | | |
|---|---|---|---|
| 4,752,358 A | | 6/1988 | Billings |
| 4,929,341 A | | 5/1990 | Thirumalachar et al. |
| 5,460,270 A | * | 10/1995 | Chan et al. .................... 209/164 |
| 5,534,136 A | | 7/1996 | Rosenbloom |
| 6,007,708 A | * | 12/1999 | Allcock et al. ................ 208/391 |
| 6,007,709 A | * | 12/1999 | Duyvesteyn et al. ......... 208/391 |
| 6,110,359 A | | 8/2000 | Davis et al. |
| 6,207,044 B1 | | 3/2001 | Brimhall |
| 2006/0076274 A1 | | 4/2006 | Duyvesteyn et al. |
| 2009/0020458 A1 | | 1/2009 | Bozak et al. |
| 2009/0294332 A1 | * | 12/2009 | Ryu ............................... 208/390 |
| 2010/0032348 A1 | | 2/2010 | Duyvesteyn et al. |
| 2010/0275600 A1 | * | 11/2010 | Speirs et al. .................... 60/670 |

FOREIGN PATENT DOCUMENTS

| | | |
|---|---|---|
| CA | 2068895 | 5/1993 |
| CA | 2582078 | 4/2006 |
| CA | 2717061 | 9/2009 |

* cited by examiner

EXTRACTION OF OIL SAND BITUMEN WITH TWO SOLVENTS

This application claims priority to Canadian Application No. 2,714,236, filed Sep. 1, 2010, which is incorporated herein by reference.

FIELD OF INVENTION

The present invention relates to a solvent extraction process for extracting bitumen from mined oil sands.

BACKGROUND OF THE INVENTION

Presently, the commercial bitumen extraction process for mined oil sands is Clark hot water extraction technology or its variants that use large amounts of water and generate a great quantity of wet tailings. Part of the wet tailings becomes mature fine tailings (MFT), which contain approximately 30% fine solids and are a great challenge for tailings treatment. In addition, certain "problem" oil sands, often having high fines content, yield low bitumen recoveries in the water-based extraction process. This leads to economic losses and environmental issues with bitumen in wet tailings.

An alternative to water-based extraction is solvent extraction of bitumen from mined oil sands, which uses little or no water, generates no wet tailings, and can potentially achieve higher bitumen recovery than the existing water-based extraction, especially for the aforementioned problem oil sands. Therefore, solvent extraction is potentially more robust and more environmentally friendly than water-based extraction.

The majority of solvent extraction processes taught in the prior art use a single solvent or a solvent mixture having a fixed composition throughout the process. This solvent may be a light solvent with a typical boiling range of 36-110° C., an intermediate solvent with a typical boiling range of 66-205° C., or a heavy solvent with a typical boiling range of 177-343° C. Examples of the light solvents are $C_5$-$C_6$ (U.S. Pat. No. 4,347,118 and U.S. Pat. No. 4,752,358), cyclohexane (U.S. Pat. No. 4,189,376), toluene (U.S. Pat. No. 4,416,764), heptane/toluene mix (U.S. Pat. No. 4,448,667), oxygenated $C_2$-$C_4$ (U.S. Pat. No. 4,929,341) and chlorinated $C_1$-$C_2$ (U.S. Pat. No. 4,532,024 and U.S. Pat. No. 6,207,044). Use of pure solvents, such as cyclohexane, toluene, oxygenated solvents or chlorinated solvents is not practical since they are usually not available in large quantities to oil sand bitumen producers. The readily available solvent is light naphtha (essentially mixed aliphatic $C_5$-$C_7$), but it is not compatible with bitumen. Asphaltene precipitates out of bitumen after mixing with this solvent, contributing to lower hydrocarbon recovery. Asphaltene precipitation in a large quantity may also cause equipment fouling and plugging, and oily dry tailings unsuitable for disposal.

Alternately, an intermediate solvent such as naphtha may be used for solvent extraction of bitumen (Canadian Patent No. 1,190,877 and U.S. Pat. No. 5,534,136). Naphtha is generally compatible with bitumen owing to its light aromatic components such as benzene, toluene, ethylbenzene and xylenes (BTEX), and/or heavy fractions with boiling points near 200° C. However, BTEX are considered toxins in soil even at ppm levels. In commercial solvent extraction operations, it would be unavoidable to include trace amounts of solvent in the dry tailings. Environmental regulations may forbid the use of any solvent containing significant amounts of BTEX in this application. The heavy fractions in naphtha make solvent recovery difficult. These fractions are considered volatile organic compounds (VOC). Regulations for VOC emissions may limit the residual light and intermediate solvent content less than 300 mg/kg of dry tailings for oil sands operations. To meet the VOC requirement, large energy input is needed to recover solvent fractions from spent solids at around 200° C. This usually makes the process uneconomical and increases the greenhouse gas emissions as well.

Alternately, a heavy solvent may be used for solvent extraction of bitumen. Examples of the heavy solvent include kerosene (U.S. Pat. No. 4,094,781) and diesel (Canadian Patent No. 1,048,432). The main problem with the heavy solvents is the poor solvent recovery from spent solids. To fully recover the heavy solvents, energy-intensive operations such as retorting or coking the spent solids are required. Energy used to heat the spent solids in these operations is usually unrecoverable, making the process uneconomical.

In addition, the use of any light or intermediate solvent poses fire hazard during the initial contact with oil sands in a vessel that is not adequately purged with an inert gas. Effectively purging such a vessel is a challenge due to the sticky nature of oil sands that may not allow the use of air locks for the feed. Hence, a process using any single solvent would be hindered by one or several of the aforementioned difficulties.

It has been suggested that using two solvents sequentially may overcome some of these problems. For example, a light aromatic solvent (Canadian Patent No. 2,582,078) or naphtha (U.S. Patent Application No. 2010/0032348) is used first for bitumen extraction, which causes no asphaltene precipitation. Subsequently, a second volatile solvent ($C_3$-$C_5$) is used for the extraction of the first solvent from the spent solids. Since bitumen is mostly removed with the first solvent, the second solvent could be a poor bitumen solvent such as liquefied propane or butane without causing significant asphaltene precipitation. However, as mentioned above, the use of BTEX-containing solvents could be problematic due to the soil toxicity issue. Fire hazard during the initial contact is also a problem.

Alternately, the first solvent can be a heavy, aromatics-rich, high-flash point solvent such as a light gas oil (LGO) (U.S. Pat. No. 3,131,141 and U.S. Pat. No. 3,117,922). It does not cause asphaltene precipitation, does not contain BTEX, and does not pose fire hazard at a typical process temperature of 20-80° C. After bitumen removal, a second light solvent is used for the extraction of the first heavy solvent from the solids. Solvent recovery from spent solids would be relatively easy after the light solvent replacement. However, separating viscous bitumen-LGO solutions from solids is a challenge. A very high LGO/bitumen ratio may be required for the separation. Since LGO requires higher temperature (over 300° C.) to distill and recycle, a high LGO/bitumen ratio would likely make the process uneconomical.

All of the aforementioned processes using two solvents have one feature in common, i.e. the solvent switch (from the first to the second solvent) occurs after the near complete extraction of bitumen. In addition to the problems mentioned above, one disadvantage of the processes with this feature is that the total solvent demand is usually twice as high as that of a single-solvent process since these dual-solvent processes are essentially two separate extractions in series. The higher solvent demand greatly increases the cost of solvent storage, handling and recycle.

U.S. Pat. No. 4,389,300 teaches feeding oil sands, presumably dry-crushed, into a single vertical column containing both countercurrent heavy solvent wash and light solvent wash at different depths. The light solvent after countercurrent wash was not completely withdrawn from the column and was allowed to mix with the heavy solvent to the point of initial contact with oil sands. Therefore, the light solvent also contributed to the bitumen extraction. This extraction scheme may reduce the total solvent demand, but the presence of the light solvent poses fire hazard at the initial contact. Additionally, the ratio of the two solvents cannot be precisely controlled or varied in various locations of a column without discrete stages. Thus, the proportion of light solvent could be either too small, thereby failing to lower the viscosity of the bitumen solution significantly, or could be too large, thereby causing asphaltene precipitation. Additionally, in a commercial-scale operation, it is difficult to crush dry oil sands to a lump size amenable to extraction without the aid of solvent or hot water.

All prior art processes were proposed for bulk oil sands without ore segregation. Due to the inherent complexity of bitumen-solids separation and solvent recovery in solvent extraction, all solvent extraction processes are uneconomical compared with the existing water-based extraction process if they are used for bulk oil sands. However, certain problem oil sands that do not yield high bitumen recoveries in water-based extraction may have higher bitumen recoveries in solvent extraction. Hence, segregating problem oil sands from bulk oil sands for solvent extraction may bring in higher economical return. This opportunity was not explored in the prior art.

In summary, none of the prior art solvent extraction processes can resolve all of the following issues:
1. Fire hazard at the initial contact of solvent with oil sands;
2. All types of solvents except for light solvents contain heavy fractions that pose a challenge in solvent recovery from spent solids;
3. BTEX in light aromatic solvents or naphtha cause toxicity issue in dry tailings disposal;
4. Light solvents that are easy to recover from spent solids and contain no BTEX cause asphaltene precipitation from bitumen;
5. Attempts to solve the above issues by using two solvents sequentially encounter solid/liquid separation problem and issues with higher solvent demand and operating cost;
6. Complete solvent recovery from spent solids to meet the environmental requirements, e.g. VOC limit, involves energy-intensive operations that increase the green-house gas emissions;
7. Being inherently more complicated, all solvent extraction processes appear uneconomical compared with the existing water-based extraction process if they are used for bulk oil sands without ore segregation.

There is a need for a solvent extraction process that is safe, operable, economical and environmentally friendly.

SUMMARY OF THE INVENTION

In accordance with a broad aspect of the invention, there is provided a solvent extraction process which uses at least two different solvents and controlled solvent mix ratios during extraction.

In one broad aspect, a high-flash point heavy solvent (HS) may be used for dense oil sand slurry preparation, which preparation includes initial contact with the oil sand, oil sand digestion and wet ore crushing. A heavy/light solvent mixture with significant proportion of light solvent (LS) may be used for the preparation of a thinner oil sand slurry for the first stage of solid-liquid separation, at which time the bitumen concentration is sufficiently high that the presence of light (poor) solvent would not cause asphaltene precipitation. A heavy/light solvent mixture with relatively more HS may be used for washing the separated solids for the second stage of solid-liquid separation to minimize asphaltene precipitation. Finally, a LS-dominant solvent mixture may be used for the subsequent stages of washing and separating the solids, at which point most of the bitumen has been removed from the solids and the amounts of precipitated asphaltene are minimal. Hence, the spent solids would subsequently become almost HS-free. The light solvent would be readily recovered from the spent solids using a thermal/stripping method.

"Heavy solvent" or "HS" as used herein means a solvent with a typical boiling range of 177-343° C. and generally include hydrocarbon liquids in the $C_{10}$ to $C_{20}$ range such as light gas oil and diesel.

"Light solvent" or "LS" as used herein means a solvent with a typical boiling range of 36-110° C. and generally include hydrocarbon liquids in the $C_5$ to $C_7$ range such as pentane, hexane, cyclohexane and heptane.

In another broad aspect of the invention, a process for extracting bitumen from oil sands using a combination of heavy solvent and light solvent is provided, comprising:
  contacting mined oil sands with a high-flash point heavy solvent (HS) to produce a dense oil sand slurry;
  mixing the dense slurry with a predominantly light solvent (LS) to give a heavy solvent to light solvent (HS/LS) mass ratio of about 70/30 to about 50/50 and subjecting the thinner oil sand slurry to a first stage solid-liquid separation to produce a first liquids stream containing bitumen and a first solids stream;
  washing the solids stream with a mixed solvent having a HS/LS mass ratio of about 75/25 to about 55/45 and subjecting the solids and the mixed solvent to a second stage solid-liquid separation to produce a second liquids stream containing residual bitumen and a second solids stream.

In one embodiment, the process further comprises washing the second solids stream with a predominantly LS stream and subjecting the solids and the predominantly LS to a third stage solid-liquid separation to produce a third liquids stream and a third solids stream. In another embodiment, the process further comprises washing the third solid stream with a substantially pure LS stream and subjecting the solids and predominantly LS to a fourth stage solid-liquid separation to produce a fourth liquids stream and a fourth solids stream. The fourth liquids stream is predominantly LS and can be used to wash the second solids stream. The fourth solids stream can be dried in a solids dryer to produce dry tailings.

BRIEF DESCRIPTION OF THE DRAWINGS

FIG. 3b is the side view of the mixer/distributor and the first solid-liquid separator of FIG. 3a.

DESCRIPTION OF VARIOUS EMBODIMENTS

Figure 1:
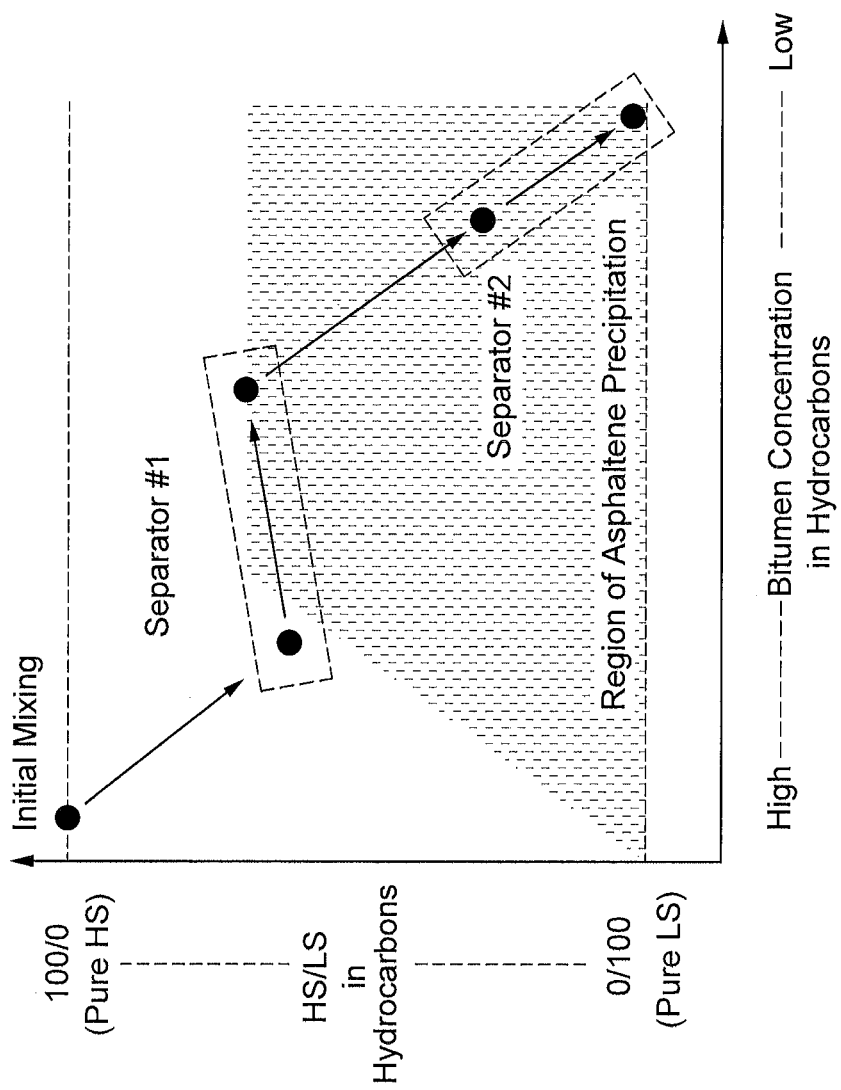
FIG. 1 is a graph of heavy solvent to light solvent ratio (HS/LS) (from 0/100 to 100/0) versus bitumen concentration in hydrocarbons (from high to low).

The present invention attempts to exploit the different properties of various solvents to allow for good bitumen recovery (reduced asphaltene precipitation), good solvent recovery, cleaner dry tailings and improved safety. Without being bound to theory, the principle behind using a flexible combination of a heavy solvent (HS) and a light solvent (LS) is illustrated in FIG. 1. FIG. 1 shows a plot of heavy solvent to light solvent ratios (HS/LS) from 0/100 to 100/0 on the Y axis versus bitumen concentration in hydrocarbons (from high to low) on the X-axis. The X-axis also represents the progression of extraction from left to right. The shaded area shows the region of asphaltene precipitation.

Each filled circle represents a stage of mixing and/or separation, as discussed in more detail below. The first circle represents the initial mixing of dry oil sand and heavy solvent to form a dense slurry. The second circle represents the addition of light solvent to the dense slurry of oil sand and heavy solvent to produce a slurry of the HS/LS around 60/40. The same circle also represents the conditions in the first stage of the first solid-liquid separator. The third circle represents the conditions in the second stage of the first solid-liquid separator where the HS/LS ratio is slightly increased to about 65/35. At this solvent mix ratio, little asphaltene will precipitate out.

The solids produced in the first separator will have a low bitumen concentration and can be further treated with light solvent to reduce the heavy solvent present in the solids in a second separator to produce tailings having little or no bitumen and little or no heavy solvent (fourth and fifth circles). In the second separator, the amount of bitumen is low enough that the addition of light solvent will not result in a significant amount of asphaltene precipitation.

The heavy solvent used in the following embodiment is a virgin light gas oil, i.e. a distillation fraction of oil sand bitumen, $C_{12}$-$C_{32}$ with a boiling range within about 220-480° C., which would not fall under the VOC regulations with respect to air quality in Canada. The HS contains approximately 30-50% aromatic compounds and is able to dissolve bitumen asphaltene. It has a flash point more than 10° C. above the process temperature, which is within the range of 20-80° C., preferably around 50° C.

The light solvent in the present embodiment could be mixed aliphatic $C_6$-$C_7$ with a boiling range of 69-110° C., which light solvent is available from bitumen upgrading units. The preferred LS is aliphatic $C_7$ with a boiling range of 85-101° C.

Figure 2:
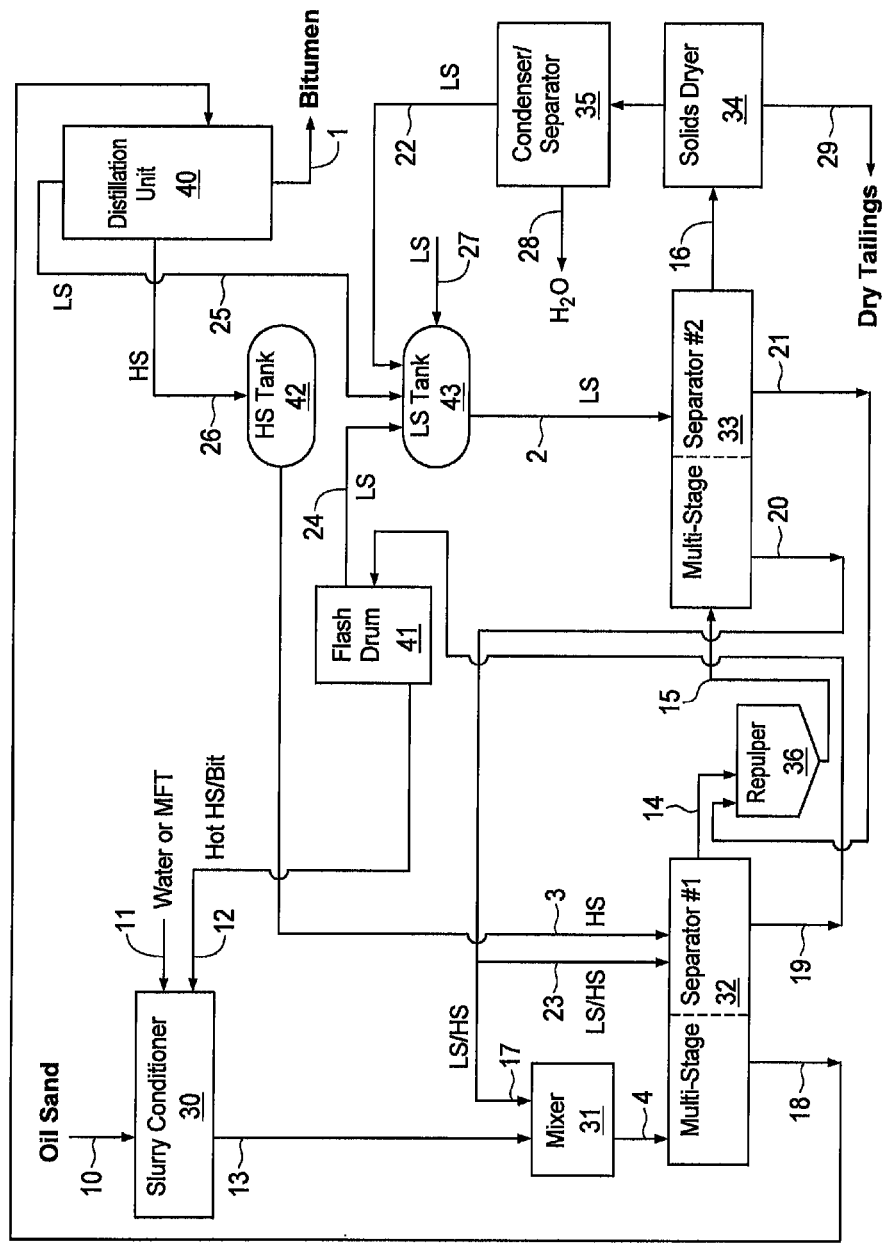
FIG. 2 is a schematic process flow diagram of one embodiment of the solvent extraction process.
Figure 3A:
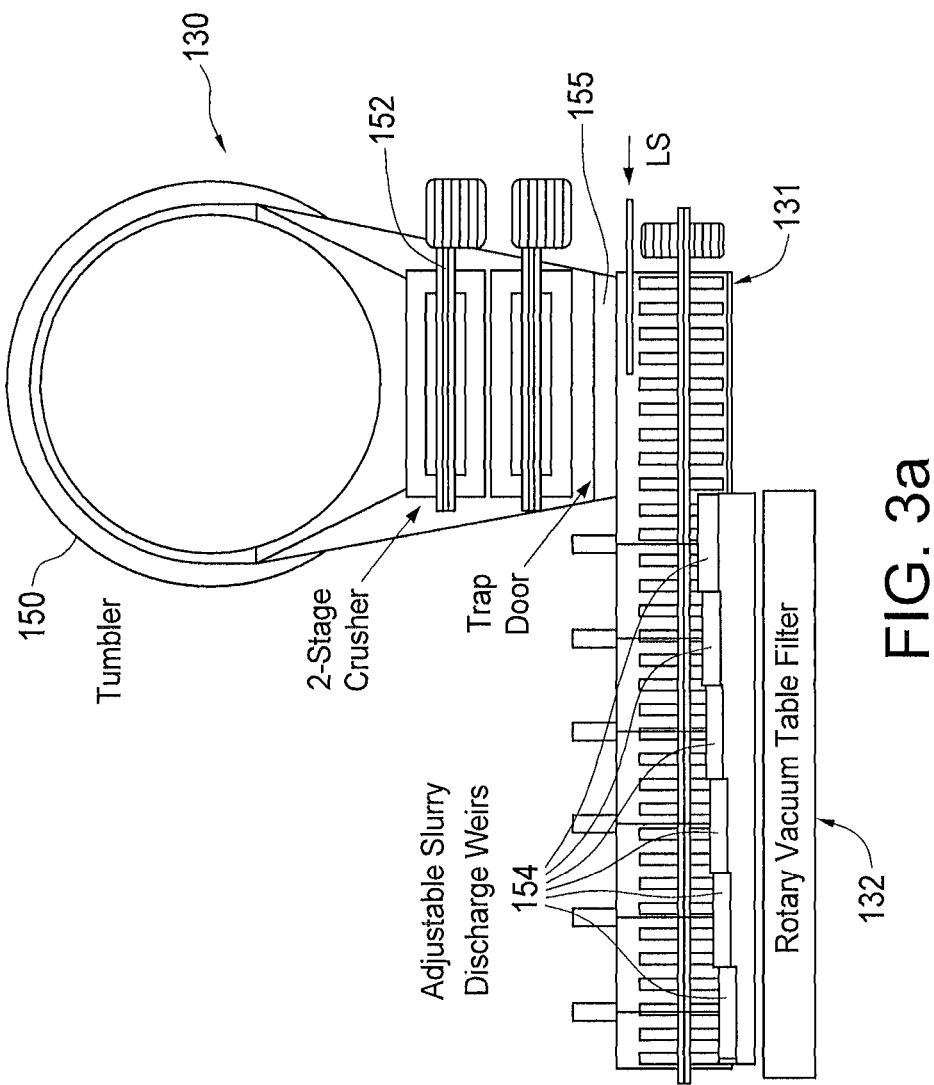
FIG. 3a is a schematic drawing showing one embodiment of a slurry preparation and conditioning unit, a mixer/distributor and a first solid-liquid separator.
Figure 3B:
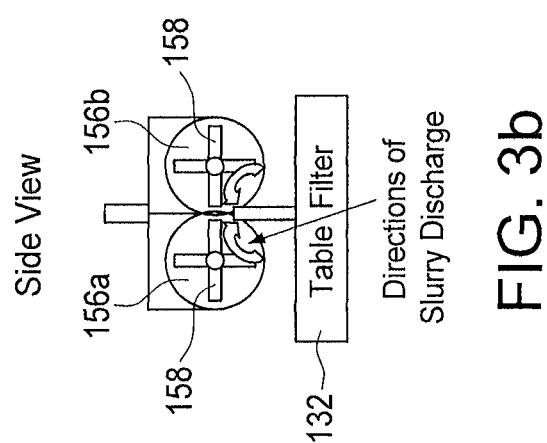

FIG. 2 shows one embodiment of flexibly combining two solvents in a commercially viable way to achieve the solvent mix ratio changes as shown in FIG. 1. Cold oil sand 10 is mixed with 0-7 wt % water or 0-10 wt % mature fine tailings (MFT) from conduit 11, and hot HS with a temperature range of about 140-190° C. from conduit 12, which hot HS may contain bitumen, in a slurry preparation and conditioning unit 30, which unit may comprise a rotating tumbler followed by a two-stage sizer/crusher, as shown in FIG. 3. Longitudinal lifters may be present in the tumbler to assist in the comminution of large oil sand lumps by lifting and dropping them on other oil sand lumps. Preferably, the mass ratio of HS to bitumen is 1-2. The solids content in the dense slurry in the slurry preparation and conditioning unit 30 is about 60-75 wt %. The dense slurry temperature is preferably around 50° C., the source of heat being primarily from the hot HS from conduit 12.

Fines liberation into the hydrocarbons should be minimized prior to the first-stage solid-liquid separation to keep the solid-liquid separation rates sufficiently high. Addition of water or MFT to the oil sand causes aggregation of fines with sand grains that minimizes the fines liberation.

An inert gas, e.g. nitrogen, may be used to continuously purge the tumbler (not shown). Some residual oxygen can be tolerated in the tumbler since the HS and the bitumen are not flammable at the slurry temperature. The inert gas purge in the tumbler acts as first-stage oxygen reduction that helps in maintaining a safe oxygen-free atmosphere in the filter enclosure box downstream.

In one embodiment, the oil sand is delivered in a dry form from a mine to a slurry preparation and conditioning unit (e.g., a tumbler/crusher circuit), which is located in an extraction plant. The entire dense slurry stream after mixing and conditioning in the slurry preparation and conditioning unit is crushed to lump sizes suitable for filtration, e.g., around 1-10 cm. The crushed dense slurry exits the unit 30 via conduit 13, and is diluted with a LS stream, which may contain a small amount of HS, from conduit 17 in a mixer 31. The diluted slurry exits the mixer 31 and enters a first solid-liquid separator 32 via conduit 4.

In one embodiment shown in FIG. 3, the slurry preparation and conditioning unit 130 comprises tumbler 150, which is located directly above a two-staged crusher 152, which also forms part of the unit 30. A mixer/distributor 131 is positioned below the two-staged crusher 152 and above first solid-liquid separator 132, which may be a vacuum table filter. The mixer/distributor 131 includes twin shafts 156a and 156b with pitched paddles 158 to distribute the slurry along the radius of the circular table filter 132 and to gently mix a LS stream from conduit 17 with the dense slurry. Adjustable weirs 154 are located along the mixer/distributor 131 to evenly feed the LS-diluted slurry onto the wedge-shaped surface of the table filter feed zone. The entire table filter 132 is enclosed in a gas-tight box (not shown) filled with an inert gas, e.g. nitrogen. In this embodiment, conduit 13 is a chute 155 connecting the crusher 152 and the mixer/distributor 131, and conduit 4 is the adjustable weirs 154 that direct the slurry onto the table filter 132. In one embodiment, a spring-loaded trap door may be installed in the chute to minimize the ingress of oxygen from the tumbler 150 to the filter enclosure box (not shown).

In another embodiment, the slurry preparation and conditioning unit 30 is located in a mine. The unit 30 may comprise a tumbler which may also include an integral rotary screen (not shown) for screening the dense slurry prior to its passage into a pumpbox (not shown). Screened oversize may be crushed to lump sizes suitable for filtration, e.g., 1-10 cm, and also passed into the pumpbox. The dense slurry is pumped from the mine to an extraction plant via conduit 13, which, in this embodiment, is a slurry pipeline. Apart from transportation, the slurry pipeline may also serve as a slurry mixer, lump digester and conditioner, thereby aiding the bitumen extraction from the interstices of the sand matrix to the liquid hydrocarbon phase. At the extraction plant, the dense slurry is further mixed with a LS stream, which may contain a small amount of HS, from conduit 17 in a mixer 31. The mixer 31 may be a horizontal twin-shaft paddle mixer as shown in FIG. 3. The LS-diluted slurry is then fed onto a first solid-liquid separator 32.

In another embodiment, both units 30 and 31 are located in a mine. A dense oil sand slurry is prepared, conditioned and crushed in the slurry preparation and conditioning unit 30. The dense slurry is passed into the mixer 31, which may comprise a pump box and which also mixes the dense slurry with a LS stream from conduit 17. The diluted slurry is pumped from the mine to an extraction plant via conduit 4, which, in this embodiment, is a slurry pipeline. At the extraction plant, the diluted slurry is pumped directly onto a first solid-liquid separator 32.

The mass ratio of HS/LS in the LS-diluted slurry is controlled to be in the range of about 70/30 to about 50/50, preferably about 60/40, by adjusting the flow rate in conduit 17 to ensure little to no asphaltene precipitation and to facilitate the subsequent solid-liquid separation.

The first solid-liquid separator 32 contains at least two stages, the two stages shown separated with a dashed line in FIG. 2. The first-stage separation generates a first liquids stream and a first solids stream. The first liquids stream is sent to a distillation unit 40 via conduit 18 to recover LS and HS, removed via conduits 25 and 26, respectively, and to produce bitumen, which is removed via conduit 1. Recovered HS and LS flow into tank 42 and tank 43, respectively. Tank 43 also receives a LS makeup stream via conduit 27. The HS makeup is produced internally by distilling the product bitumen in the unit 40 since the HS here is a fraction of bitumen. The HS makeup is included in the recovered HS stream from conduit 26. In one embodiment, the first liquids stream goes through a single-stage gravity settling (not shown). The overflow is sent via conduit 18 to a distillation unit 40. The underflow is mixed with a second liquids stream from the separator 32 in conduit 19.

After the first-stage separation, the first solids stream from the separator 32 receives a mixed liquid stream containing an LS-dominant stream from conduit 23 and a pure HS stream from conduit 3 for washing, and goes through a second-stage solid-liquid separation to generate a second liquids stream and a second solids stream. The mass ratio of HS/LS in the washing liquid, i.e. the combined stream from conduits 3 and 23, is maintained in the range of about 75/25 to about 55/45, preferably about 65/35, by adjusting the flow rate in conduit 3. At this solvent mix ratio, there is little asphaltene precipitation. The second liquids stream from the separator 32 is sent via conduit 19 to a flash drum 41 to remove LS, which is cooled and recycled through conduit 24 into tank 43, and produce hot HS, which is removed via conduit 12 and used in the slurry preparation and conditioning unit 30.

In one embodiment, the second solids stream flows out of the first separator 32 via conduit 14 into a repulper 36. A LS-dominant stream from conduit 21 is pumped into the repulper 36 as well. The repulper 36 provides vigorous mixing of the solids stream from conduit 14 and the LS-dominant stream from conduit 21 to dissolve any trapped bitumen and HS. In one embodiment, the repulper 36 is a baffled tank agitated with impellers. After repulping, the slurry is fed via conduit 15 onto a second solid-liquid separator 33.

In another embodiment, the repulping step is omitted. The second solids stream from conduit 14 is fed directly to the second solid-liquid separator 33, which may be the same separator as the first solid-liquid separator 32. The LS-dominant stream from conduit 21 is used as washing liquid in the separator 33.

The second solid-liquid separator 33 contains at least two stages (third and fourth stages), the two stages shown separated with a dashed line in FIG. 2. The third-stage solid-liquid separation generates a third liquids stream and a third solids stream. The third liquids stream, which comprises primarily light solvent, is removed via conduit 20 to be split into streams 17 and 23 for reuse in the separator 32. The split ratio is in the range of about 50/50 to about 90/10 for streams 17 and 23.

After the third-stage separation, the third solids stream in the separator 33 receives pure LS from conduit 2 for countercurrent washing and goes through a fourth-stage solid-liquid separation to generate a fourth liquids stream and a fourth solids stream. The fourth liquids stream, which comprises primarily light solvent, is removed via conduit 21 for reuse in the repulper 36. In the separator 33, the mass ratio of HS/LS in the hydrocarbons drops from about 60/40 to almost 0/100 (pure LS). Because most of the bitumen has been removed from the solids, the amount of precipitated asphaltene in the separator 33 is minimal. The washing with LS in this separator results in the fourth solids (spent solids) stream that is almost HS-free. The residual light solvent can be readily recovered from the spent solids using a thermal/stripping method.

The first and second separators (32 and 33) are preferably, although not limited to, vacuum table filters with multi-stage countercurrent wash capability and gas-tight enclosure, filled with an inert gas, e.g., nitrogen.

The spent solids from the separator 33 are removed via conduit 16 into a dryer 34. In one embodiment, the conduit 16 may be jacketed screw conveyor to preheat the spent solids with steam in the jacket. The dryer 34 is preferably, although not limited to, a rotary indirect dryer operating at a solids temperature around 100° C., where the spent solids are dried to the LS content of less than 160 mg/kg of solids, below the aforementioned VOC limit for oil sands operations. This usually requires a low moisture content of less than 0.5 wt % in the solids. The recovered vapors (LS and $H_2O$) flow to a condenser/separator 35. The cooling medium used in condenser/separator 35 may be cold recycle cooling water (RCW). The warm RCW produced after heat exchange in condenser/separator 35 may be used in water-based bitumen extraction process, which may be running in parallel with the solvent extraction process, as described in more detail below. Condensed LS flows out via conduit 22 to the LS tank 43. Condensed water flows out via conduit 28 and could be recycled for steam generation if needed.

The dry solids are removed via conduit 29. In one embodiment, conduit 29 may be a screw conveyor with stripping steam flowing countercurrent to the dry solids to remove the residual LS. The stripping steam with residual LS flows into the dryer 34 and is condensed in the condenser 35.

In one embodiment, the dry solids may be further mixed with mature fine tailings (MFT) that are produced in water-based processes and typically contain about 30 wt % solids, at a mass ratio of about 1:0.25 to make a trafficable solids mixture containing about 85 wt % solids. This mixture, which is more consolidated and less dusty than loose dry solids, can be transported to a land reclamation site for disposal. Alternately, the MFT proportion may be significantly higher to make a non-segregated composite tailings, containing about 55-70 wt % solids, to be delivered to a field for drying in ambient air. The non-segregating nature of the composite tailings generally makes it dry within a short period of time. In another embodiment, the dry solids may be mixed with water and disposed as trafficable solids, which contain about 85 wt % solids.

The preferred mass ratio of HS to bitumen is, although no limited to, around 1-1.5 based on the mass flow rate of solvent in conduit 3 and the mass flow rate of bitumen in conduit 1. The preferred mass ratio of LS to bitumen is, although no limited to, 2-4 based on the total mass flow rate of solvent in conduit 2 and the mass flow rate of bitumen in conduit 1. The resulting bitumen recovery is about 94% for Athabasca oil sands containing more than 40% fines (less than 44 μm) in solids. The recoveries of heavy solvent and light solvent are about 97% and about 99% or greater, respectively.

It should be noted that the commercial water-based extraction process is generally not capable of processing oil sands with more than 40% fines without blending with low-fines oil sands. Thus, the present invention also comprises a method of integrating the aforementioned solvent extraction process into the existing water-based extraction process to substantially improve the economic return, reduce greenhouse gas emissions, and reduce wet tailings production. The integration includes the following three aspects: ore segregation, energy integration, and wet tailings reduction and sequestration.

1) Ore Segregation

Figure 4:
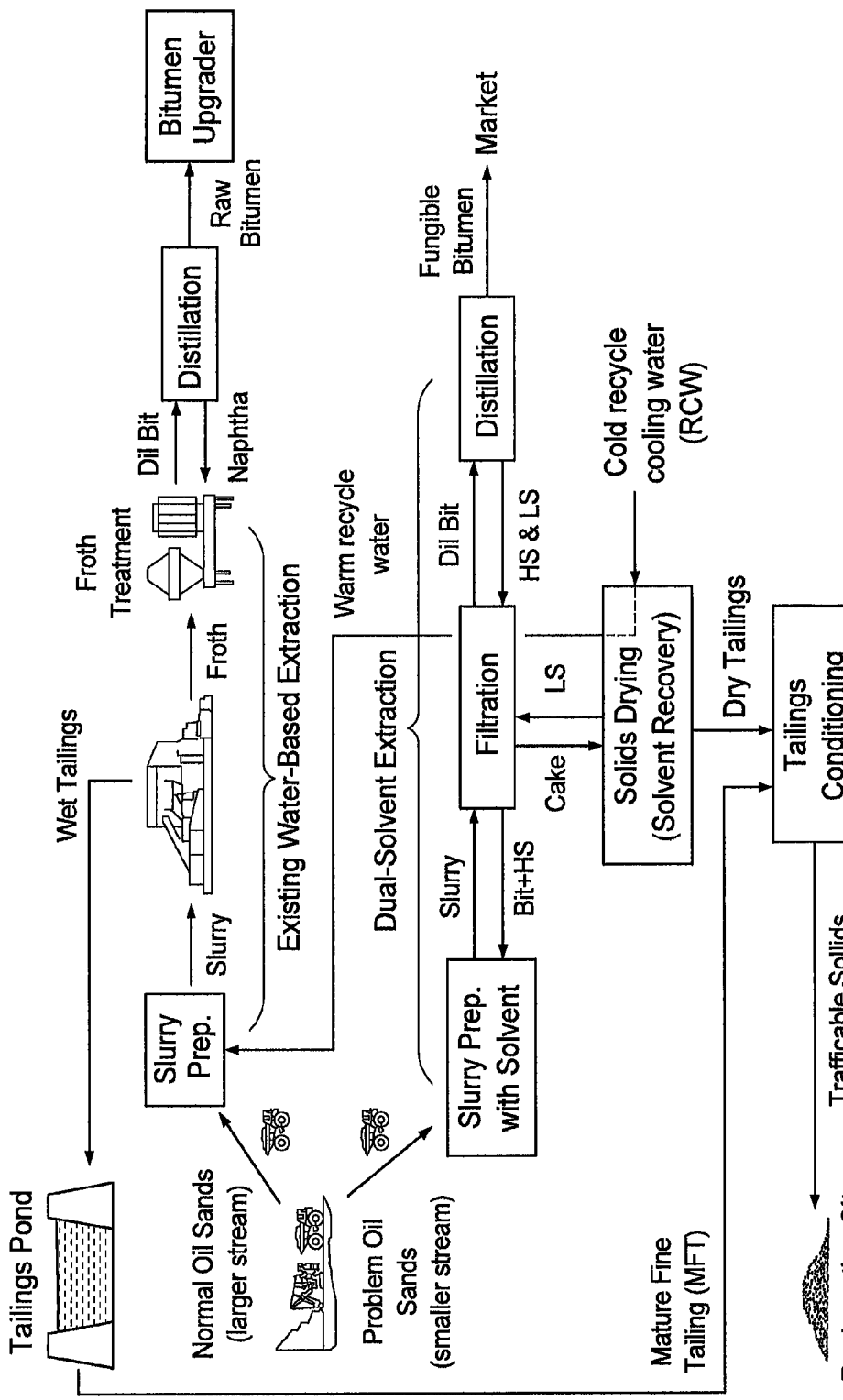
FIG. 4 is a schematic drawing showing the integration of one embodiment of the solvent extraction process with a water-based bitumen extraction process through ore segregation.

With reference now to FIG. 4, a dual-solvent extraction train (below) is running in parallel with a significantly larger water-based extraction train (above). All "problem" oil sands, defined as oil sands causing low bitumen recovery (less than about 60%) in the water-based extraction, are segregated during mining and sent to the smaller solvent extraction train. All "normal" oil sands, defined as oil sands causing reasonably high bitumen recovery in the water-based extraction, are processed in the existing water-based extraction train. This ore segregation can be achieved in the truck-and-shovel mining, since problem oil sands are present in certain ore facies previously characterized by mine geologists.

For a hypothetical mine containing ⅑ (11%) problem oil sands (av. grade 8.9%) and ⅘ (89%) normal oil sands (av. grade 11.5%), the bitumen recovery from water-based extraction on normal oil sands alone is uplifted by approximately 6% from the base case, in which the bulk oil sands are processed with the water-based extraction. The increased bitumen recovery is due to the fact that is not contaminated with the problem oil sands. The bitumen recovery for the problem oil sands remains high (about 94%) when the problem oil sands are processed with the dual-solvent extraction. In an economical evaluation based solely on the bitumen produced from a solvent extraction train, the results are usually unfavorable for building such a process train due to large capital investment. However, by including the amounts of additional bitumen produced in the larger water-based extraction train because of the aforementioned recovery uplift, which is about 50% of the amounts of bitumen produced in the smaller solvent extraction train, the economical evaluation would be favorable for the solvent extraction process.

The prerequisite for this ore segregation method is that the solvent extraction process is capable of yielding high bitumen recoveries from problem oil sands. Example 2 shows that the dual solvent extraction method of the present invention is able to attain this goal.

2) Energy Integration

Recovery of LS to the point that is in compliance with VOC emission regulations usually requires evaporation of almost all naturally present and added water from the tailings in the process. Therefore, large energy input is needed to heat and vaporize water and solvent. The hot vapors subsequently need to be condensed using cooling water. The resulting warm cooling water carries low-grade energy that has very limited use. If this energy is not recovered and reused, a solvent extraction process would emit significantly larger amount of greenhouse gas per unit of bitumen produced than a water-based extraction process would. This would negate the environmental benefit for the solvent extraction process that does not generate wet tailings. With an integrated system, the resulting warm water can be used in the parallel water-based extraction process, which requires heated water. Thus, through such energy integration, the overall greenhouse gas emissions and the operating cost can be reduced.

Figure 5:
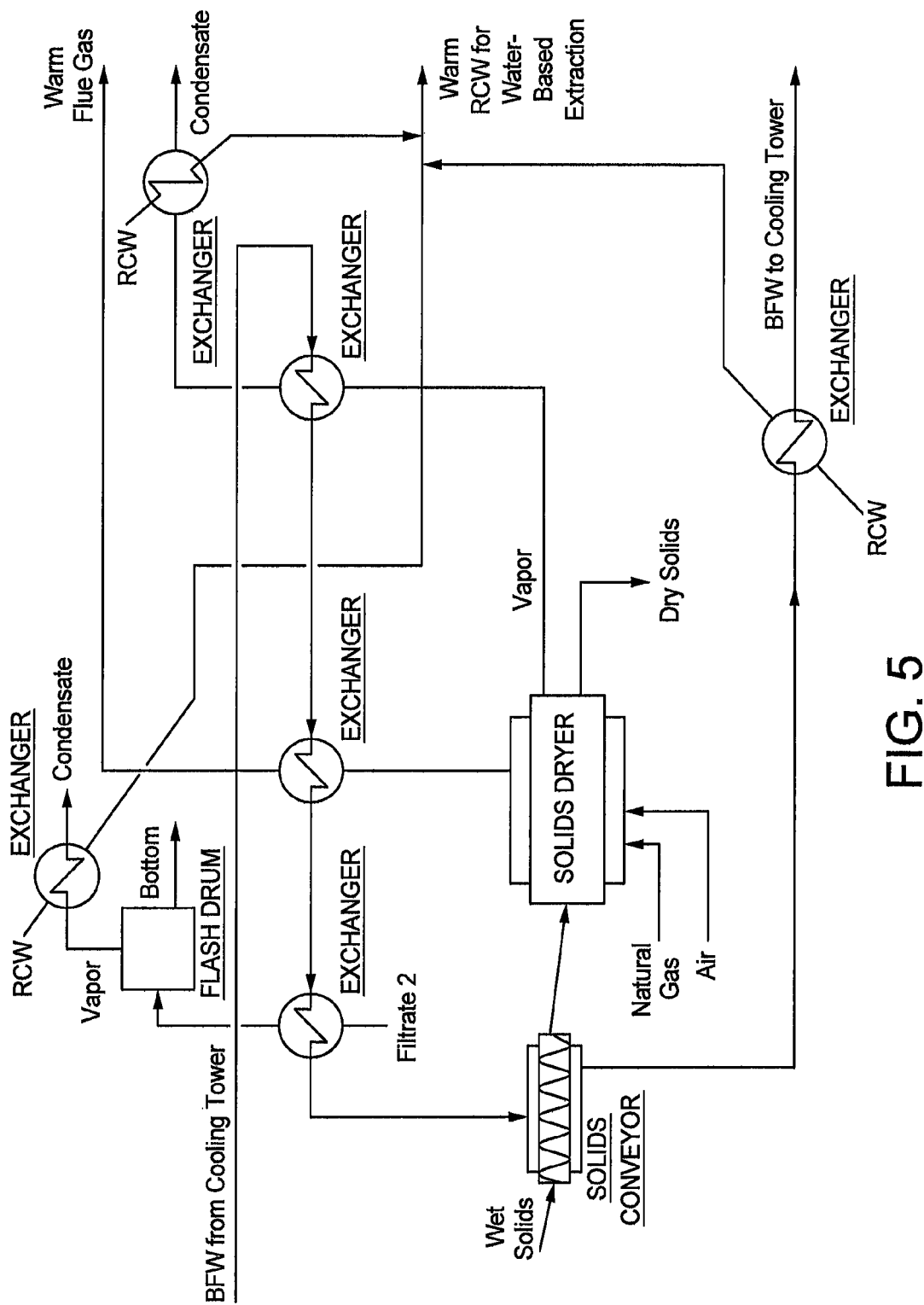
FIG. 5 is a schematic process flow diagram of one embodiment of the solvent extraction process with energy integration with a water-based extraction process.

FIG. 5 shows one embodiment of energy recovery in the solvent extraction. A boiler-feed water (BFW) circuit is used to recover heat from the vapor product of the solids dryer and the hot flue gas of the same solids dryer, and generate high-pressure steam. This steam is used in the process to heat the filtrate 2 stream, i.e. stream 19 in FIG. 2, and preheat the wet solids feed to the dryer. The residual heat in the BFW circuit is recovered by a cold recycle cooling water (RCW) stream. Cold RCW streams are also used to condense the vapor streams from the flash drum and the solids dryer. The resulting warm RCW streams are combined and used in water-based extraction.

3) Wet Tailings Reduction and Sequestration

Problem oil sands are usually high-fines oil sands. Depending on the compositions of ore bodies, processing ⅑ (11%) of the oil sands in a mine through solvent extraction can reduce the amount of mature fine tailings (MFT) generation by about 18-30% (100% being the total amounts of MFT generated in the same mine if all oil sands are processed with water-based extraction). In contrast, the reduction of MFT generation can only be 11% if bulk oil sands are processed with solvent extraction without ore segregation.

Some of the existing MFT from water-based extraction can be sequestered with dry tailings from solvent extraction to make aforementioned trafficable solids or non-segregated composite tailings, thereby further reducing the amounts of MFT in inventory. Mixing dry solids from solvent extraction with MFT to form trafficable solids is not straightforward. The relatively small amounts of MFT tend to stick to equipment surfaces and not mix properly with dry solids. In one embodiment, dry solids are added continuously to a tumbler without lifters (not shown), which rolls the solids gently. MFT is pumped onto the rolling solids to form 1-10 mm agglomerates, which are sufficiently uniform in composition and are not sticky. These agglomerates are then discharged from the tumbler continuously. Water may be used to replace MFT in the same device to form agglomerates.

Example 1

A vacuum filtration test was performed using an oil sand sample containing 8.5% bitumen, 4.6% water and 86.6% solids. The fines (less than 44 µm) content was 40% in solids. This oil sand sample had been previously tested in a water-based extraction pilot and yielded 0% bitumen recovery. The filter area was 11 cm$^2$ and the filter opening was 180 µm. The filter cake thickness was 5 cm. The vacuum was around −0.7 bar. The filtration temperature was 50° C. The boiling range of the virgin light gas oil (HS) used was 177-424° C. The light solvent (LS) was n-heptane. The filtration rates are shown in Table 1.

TABLE 1

| Test no. | Bitumen conc. in hydrocarbons (wt %) | Mass ratio of HS/LS | Average filtrate flow rate* (L/m$^2$ s) |
|---|---|---|---|
| 1 | 29.7 | ∞ (no LS) | 0.13 |
| 2 | 34.6 | 3 (75/25) | 0.10 |
| 3 | 34.6 | 1.5 (60/40) | 0.31 |

*These rates are for comparative purpose only and are increased in later experiments with better conditions in the slurry conditioning step.

Table 1 shows an example of the filtration performance in the first stage separation. When no light solvent was used (test no. 1), the filtration rate was slow even at somewhat lower bitumen concentration. When the HS/LS ratio was 3 (test no. 2), the filtration rate was slow as well. However, when the HS/LS ratio reached 1.5, i.e. 60/40, the filtration rate was significantly improved. Therefore, lowering the HS/LS ratio to 1.5 as shown in test no. 3 will likely result in a faster separation process than some of the prior art where no LS was involved in the first-stage separation as shown in test no. 1. No asphaltene precipitation occurred during the test.

Example 2

1500 g of two different types of problem oil sand samples were used in the tests. Both were lean oil sands with fines contents around 49% in solids. The oil sand was mixed with 1 wt % water and a bitumen solution in HS in a tumbler to form a dense slurry at 55° C. A LS sample (n-heptane+methylcyclohexane) was added to the dense slurry to make HS/LS around 1.5. The diluted slurry was filtered on a Buckner-type filter of 113 cm$^2$ with a filter cake thickness of 8 cm. The vacuum was −0.6 bar. The filter temperature was kept around 50° C. A HS/LS mixture was then used to rinse the cake. The rinsed cake was repulped with the same LS sample used above in an agitated vessel. The slurry was transferred back to the filter for filtration and one last rinse with the same LS sample used above. The filter used for the first two stages of filtration prior to repulping is called "Filter #1". The same filter used for the last two stages of filtration after repulping is called "Filter #2". The recoveries of bitumen and HS and the filter process rates are shown in Tables 2a and 2b, respectively. The final cakes contained about 0.8 wt % bitumen and HS combined, about 5 wt % water and about 5 wt % LS.

TABLE 2a

| Oil sand sample no. | Bitumen conc. in oil sand | Bitumen recovery in a water-based extraction pilot | Bitumen recovery in dual-solvent extraction | HS recovery in dual-solvent extraction* |
|---|---|---|---|---|
| 1 | 6.3% | 15.3% | 94.2% | 97.7% |
| 2 | 7.8% | 54.6% | 93.7% | 97.4% |

*Based on a hypothetical HS/bitumen mass ratio of 1.3.

TABLE 2b

| Oil sand sample no. | Filter #1 process rate* (t/m$^2$ h) | Av. filtrate flow rate in Filter #1 (L/m$^2$ s) | Filter #2 process rate* (t/m$^2$ h) | Av. filtrate flow rate in Filter #2 (L/m$^2$ s) |
|---|---|---|---|---|
| 1 | 4.5 | 0.82 | 8.0 | 1.55 |
| 2 | 4.3 | 0.77 | 9.6 | 2.05 |

*Based on the metric tonnes of oil sand feed.

This example simulated two stages of washing/filtration in a first separator (Filter #1), followed by repulping, and followed by two stages of countercurrent washing/filtration with a light solvent in a second separator (Filter #2). The high filter process rates make the process commercially feasible. The high bitumen recoveries for the problem oil sands ensure that the process can be integrated with the existing water-based extraction process through aforementioned ore segregation.

Example 3

Spent filter cakes of 5 cm in thickness containing approximately 7 wt % heptane and 4 wt % water were stripped with argon at 95° C. Stripping was stopped at various moisture contents in solids. The residual heptane concentrations in solids are shown in Table 3.

TABLE 3

| Test no. | Water conc. in solids (wt %) | Heptane conc. in solids (mg/kg) |
|---|---|---|
| 1 | 1.32 | 496 |
| 2 | 0.56 | 163 |
| 3 | 0.19 | 29 |

This example showed that the moisture content in packed spent solids must be below 0.5 wt % to achieve the light solvent concentration lower than 160 mg/kg of solids based on data interpolation. The result indicates that the light solvent recovery in the process can be greater than 99%.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A process for extracting bitumen from oil sand, comprising:
   (a) contacting mined oil sand with a high-flash point heavy solvent (HS) to produce a dense oil sand slurry;
   (b) mixing the dense slurry with a predominantly light solvent (LS) stream in a mixer to produce a thinner oil sand slurry having a heavy solvent to light solvent (HS/LS) mass ratio of about 70/30 to about 50/50 and subsequently subjecting the thinner oil sand slurry to a first stage solid-liquid separation to produce a first liquids stream containing bitumen and a first solids stream;
   (c) washing the first solids stream with a mixed solvent having a HS/LS mass ratio of about 75/25 to about 55/45 and subjecting the solids and the mixed solvent to a second stage solid-liquid separation to produce a second liquids stream containing residual bitumen and a second solids stream.

2. The process of claim 1, wherein the LS present in the second liquids stream is flashed off in a flash drum, and the bitumen and HS recovered in the flash drum bottom stream are used as the high-flash point heavy solvent (HS) to produce the dense oil sand slurry in step (a).

3. The process of claim 1, further comprising:
   (d) washing the second solids stream with a predominantly LS stream and subjecting the solids and the predominantly LS to a third stage solid-liquid separation to produce a third liquids stream and a third solids stream.

4. The process of claim 3, further comprising:
   (e) washing the third solid stream with a substantially pure LS stream and subjecting the solids and predominantly LS to a fourth stage solid-liquid separation to produce a fourth liquids stream and a fourth solids stream.

5. The process of claim 4, wherein the fourth liquids stream is the solvent stream used in step (d).

6. The process of claim 3, wherein the third liquids stream from step (d) is reused in either the first-stage separation [step (b)], the second-stage separation [step (c)], or both.

7. The process of claim 1, wherein the HS is a non-volatile, high-flash point virgin light gas oil, distilled from oil sand bitumen, and has a boiling range of about 220-480° C.

8. The process of claim 1, wherein the LS is mixed aliphatic $C_6$-$C_7$, produced from an oil sand bitumen upgrading unit, and has a boiling range of about 69-110° C.

9. The process of claim 8, wherein the LS boiling range is about 85-101° C.

10. The process of claim 4, wherein the second solids stream and the predominantly LS are vigorously mixed in a repulper prior to separation in the third solid-liquid separator.

11. The process of claim 4, wherein the LS present in the fourth solids stream is recovered by drying the fourth solids stream in a solids dryer to produce dry tailings.

12. The process of claim 1, wherein the dense oil sand slurry and the predominantly LS stream are mixed in a mixer/distributor that further distributes the thinner oil sand slurry to the first solid-liquid separator.

13. The process of claim 1, wherein the dense oil sand slurry is produced at the mine site and is transported through a pipeline which is connected to an extraction plant where steps (b) and (c) occur.

14. The process of claim 5, wherein the ratio of HS/LS continuously varies from the first to the last separation stage to optimize bitumen recovery and separation rate.

15. The process of claim 1, wherein the oil sand contains fines as high as 49% in solids and bitumen as low as 6%, and the bitumen and the HS recoveries are at least about 94% and 97%, respectively.

16. The process of claim 11, wherein the solids dryer removes and recovers greater than 99% LS from the fourth solids stream and leaves less than about 160 mg/kg of LS in solids.

17. The process of claim 1, further comprising
integrating the process with an existing water-based extraction process by ore segregation, whereby problem oil sands are processed with solvent extraction and normal oil sands are processed with water-based extraction.

18. The process of claim 2, further comprising integrating the energy used in the flash step with an existing water-based extraction process by recovering the waste heat from the flash step in a warm water stream that is used in the water-based extraction process.

19. The process of claim 11, further comprising integrating the energy used in the solids dryer with an existing water-based extraction process by recovering the waste heat from the solids dryer in a warm water stream that is used in the water-based extraction process.

20. The process of claim 11, whereby the dry tailings are mixed with mature fine tailings (MFT) to produce trafficable solids containing about 85 wt % solids or non-segregated composite tailings containing about 55-70 wt % solids.

21. The process of claim 20, wherein the MFT is mixed with dry solids in a tumbler without lifters to form trafficable agglomerates that are not sticky.

22. The process of claim 1, wherein the dense oil sand slurry is produced in a slurry preparation and conditioning unit.

23. The process of claim 22, wherein the slurry preparation and conditioning unit comprises a rotatable tumbler.

24. The process of claim 23, wherein the slurry preparation and conditioning unit further comprises a two-stage crusher positioned below the rotatable tumbler for further crushing the oil sand.

25. The process of claim 1, wherein the dense oil sand slurry and the predominantly light solvent (LS) stream are mixed using a paddle mixer/distributor.

26. The process of claim 1, wherein the solids are separated from the liquids in a solid-liquid separator comprising a vacuum table filter.

* * * * *